US012499780B2

(12) United States Patent
Mahn

(10) Patent No.: US 12,499,780 B2
(45) Date of Patent: Dec. 16, 2025

(54) SIMULATED CERVICAL TISSUE AND METHODS FOR MAKING AND USING THE SAME

(71) Applicant: UNIVERSITY OF FLORIDA RESEARCH FOUNDATION, Gainesville, FL (US)

(72) Inventor: Savanna Mahn, Gainesville, FL (US)

(73) Assignee: UNIVERSITY OF FLORIDA RESEARCH FOUNDATION, INC., Gainesville, FL (US)

(*) Notice: Subject to any disclaimer, the term of this patent is extended or adjusted under 35 U.S.C. 154(b) by 460 days.

(21) Appl. No.: 18/245,364

(22) PCT Filed: Sep. 15, 2021

(86) PCT No.: PCT/US2021/050438
§ 371 (c)(1),
(2) Date: Mar. 15, 2023

(87) PCT Pub. No.: WO2022/060824
PCT Pub. Date: Mar. 24, 2022

(65) Prior Publication Data
US 2023/0377485 A1    Nov. 23, 2023

Related U.S. Application Data

(60) Provisional application No. 63/079,316, filed on Sep. 16, 2020.

(51) Int. Cl.
G09B 23/30          (2006.01)
(52) U.S. Cl.
CPC ................................ *G09B 23/30* (2013.01)

(58) Field of Classification Search
None
See application file for complete search history.

(56) References Cited

U.S. PATENT DOCUMENTS

| | | | |
|---|---|---|---|
| 2016/0232819 A1* | 8/2016 | Hofstetter | G09B 23/285 |
| 2019/0085162 A1* | 3/2019 | Felsinger | B29C 39/003 |
| 2019/0333413 A1* | 10/2019 | Bauer | G09B 23/303 |

FOREIGN PATENT DOCUMENTS

WO    2015/003271 A1    1/2015

OTHER PUBLICATIONS

International Search Report and Written Opinion for PCT/US2021/050438 mailed Dec. 15, 2021.

* cited by examiner

*Primary Examiner* — James B Hull
(74) *Attorney, Agent, or Firm* — Thomas | Horstemeyer, LLP

(57) ABSTRACT

Described herein, the disclosure, in one aspect, relates to simulated cervical tissues composed of a gel and red-toned pigment, wherein the cervical tissue has a first face, wherein the first face includes one or more simulated lesions. Methods for constructing the simulated cervical tissue are also disclosed. Additionally, disclosed are kits composed of two or more simulated cervical tissues as described herein, wherein the simulated cervical tissues are different from each based on (1) the number of simulated lesions on each first face of each simulated cervical tissue, (2) the position of the simulated lesions on each first face of each simulated cervical tissue, or a combination thereof. The simulated cervical tissues and kits described herein are useful training tool for performing colposcopies and cam be incorporated into cervical trainers.

16 Claims, 2 Drawing Sheets

Difficulty Level: Easy

Difficulty Level: Medium

Difficulty Level: Hard

SIMULATED CERVICAL TISSUE AND METHODS FOR MAKING AND USING THE SAME

CROSS-REFERENCE TO RELATED APPLICATIONS

This application is the 35 U.S.C. § 371 national stage application of PCT application serial number PCT/US2021/050438, filed on Sep. 15, 2021, which claims priority to U.S. provisional application entitled "SIMULATED CERVICAL TISSUE AND METHODS FOR MAKING AND USING THE SAME," having Ser. No. 63/079,316, filed on Sep. 16, 2020, which are entirely incorporated herein by reference.

BACKGROUND

Colposcopy is a common office procedure providing a magnified view of the cervix for the evaluation of an abnormal cytology result. Training systems for performing colposcopies are limited but much needed, particularly in medical schools, hospitals, and training facilities. The present disclosure addresses these needs.

SUMMARY

In accordance with the purpose(s) of the present disclosure, as embodied and broadly described herein, the disclosure, in one aspect, relates to simulated cervical tissues composed of a gel and red-toned pigment, wherein the cervical tissue has a first face, wherein the first face includes one or more simulated lesions. Methods for constructing the simulated cervical tissue are also disclosed. Additionally, disclosed are kits composed of two or more simulated cervical tissues as described herein, wherein the simulated cervical tissues are different from each based on (1) the number of simulated lesions on each first face of each simulated cervical tissue, (2) the position of the simulated lesions on each first face of each simulated cervical tissue, or a combination thereof. The simulated cervical tissues and kits described herein are a useful training tool for performing colposcopies and can be incorporated into cervical trainers.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

Figure 1:
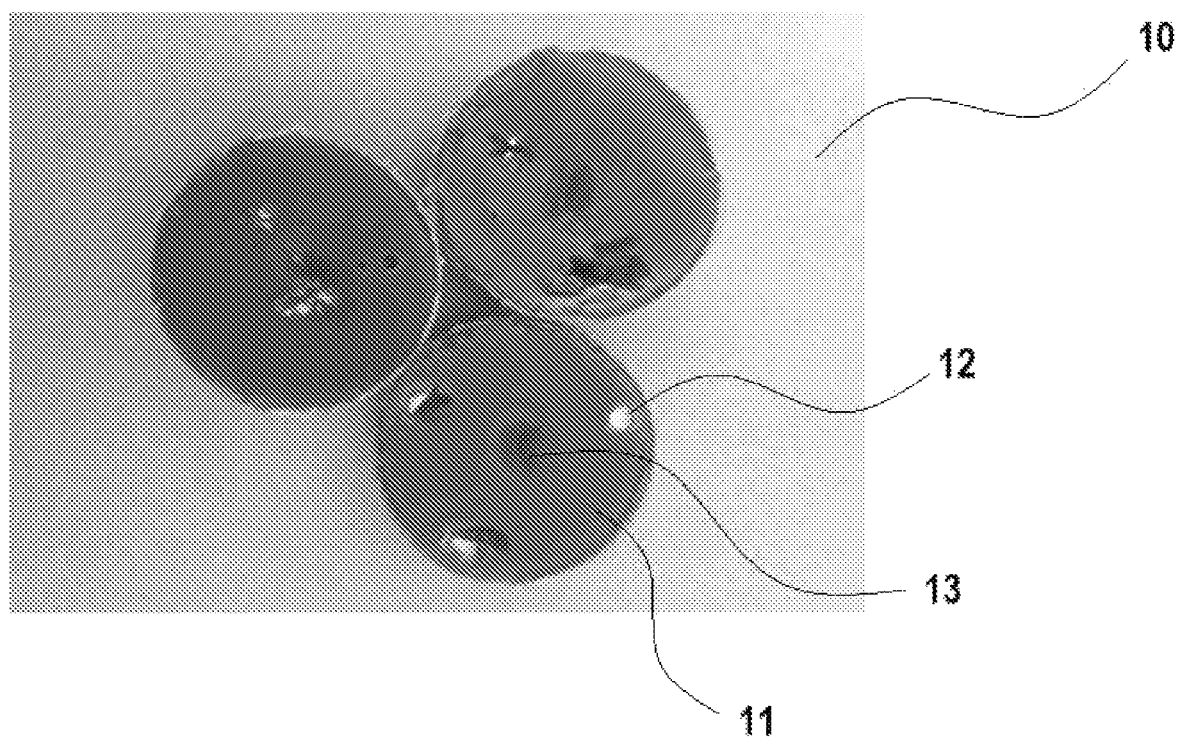
FIG. 1 shows a simulated cervical tissue described herein.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

Definitions

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by," "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used in the specification and the appended claims, the singular forms "a," "an" and "the" include plural referents unless the context clearly dictates otherwise. Thus, for example, reference to "a pigment" or "a gel," includes, but is not limited to, mixtures of two or more such pigments or gels, and the like.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the term "effective amount" refers to an amount that is sufficient to achieve the desired modification of a physical property of the composition or material. For example, an "effective amount" of a pigment refers to an amount that is sufficient to achieve the desired improvement in the property modulated by the formulation component, e.g. achieving the desired color or opacity. The specific level in terms of wt % in a composition required as an effective amount will depend upon a variety of factors including the amount and type of pigment, amount and type of gel, and desired texture and/or appearance of the simulated cervical tissue in which the pigment is added.

As used herein, the terms "optional" or "optionally" means that the subsequently described event or circumstance can or cannot occur, and that the description includes instances where said event or circumstance occurs and instances where it does not.

"Admixing" or "admixture" refers to a combination of two or components together wherein there is no chemical reaction or physical interaction. The terms "admixing" and "admixture" can also include the chemical reaction or physical interaction between any of the components described herein upon mixing to produce the composition. The components can be admixed alone, in water, in another solvent, or in a combination of solvents.

Unless otherwise specified, temperatures referred to herein are based on atmospheric pressure (i.e. one atmosphere).

Disclosed herein is a simulated cervical tissue. Also disclosed herein are methods for constructing the simulated cervical tissue and methods for using the same. Individual components of the simulated cervical tissue are discussed in detail below.

Gel

In one aspect, the simulated cervical tissue is composed primarily of a gel. The gel can have properties such that it simulates soft tissue such as, for example, human tissue. The gel can easily be melted and poured into a mold of any desired shape or size. In other aspects, once the simulated cervical tissue has been used, the gel can be re-melted and recycled to produce a new simulated cervical tissue.

In one aspect, the gel comprises a medical gel. In another aspect, the gel comprises gelatin. In one aspect, the gelatin is 100% synthetic and contains no organic materials. In another aspect, the gelatin is clear, odorless, reusable, temperature stable (temperatures up to 190° F. or about 88° C.), and non-toxic. In one aspect, gel is a gelatin produced by Humimic Medical. In another aspect, the gel is Humimic Medical gels nos. 0, 1, 2, 3, 4, or 5.

In one aspect, the gel has a density of from about 800 kg/m$^3$ to about 1,000 kg/m$^3$, or of about 800 kg/m$^3$, 800 kg/m$^3$, 850 kg/m$^3$, 900 kg/m$^3$, 950 kg/m$^3$, 1,000 kg/m$^3$, or a combination of any of the foregoing values, or a range encompassing any of the foregoing values.

In one aspect, the gel has a Young's modulus of from about 300 kPa to about 800 kPa, or of about 300 kPa, 400 kPa, 500 kPa, 600 kPa, 700 kPa, or 800 kPa, or a combination of any of the foregoing values, or a range encompassing any of the foregoing values.

In one aspect, the gel is 100% gelatin having a density of from about 800 kg/m$^3$ to about 850 kg/m$^3$. In another aspect, the gel is 100% gelatin having a density of from about 800 kg/m$^3$ to about 850 kg/m$^3$ and a Young's modulus of from about 300 kPa to about 350 kPa.

Pigment

The simulated cervical tissue is composed of one or more pigments such that the simulated cervical tissue has the appearance of real tissue. In one aspect, the pigment is a silicone. In one aspect, the pigment can be SI LC PIG™ pigments (Smooth-On, Macungie, PA). In one aspect, the pigment is a red-toned pigment. In one aspect, the red-toned pigment has a Pantone Color Matching System (PMS) of 186C (red) or 7421C (blood). In another aspect, the red-toned pigment is a mixture of silicone pigments (red pigment (PMS 186C), blood (PMS 7421C), and PMS white) to produce a pink hue in the simulated cervical tissue.

The amount of the pigment incorporated into the simulated cervical tissue can vary. Altering the amount of pigment added to the gel can modify the opacity of the simulated cervical tissue. Thus, the appearance of the simulated cervical tissue will look more like real human tissue. In certain aspects, the simulated cervical tissue does not include a dye or food coloring, which are not a pigment as described herein.

In one aspect, the weight ratio of the gel to the red-toned pigment is from 0.001% total gel weight to 3% total gel weight, or is about 0.001, 0.005, 0.01, 0.05, 0.1, 0.5, 1, 1.5, 2, 2.5, or about 3% total gel weight, or a combination of any of the foregoing values, or a range encompassing any of the foregoing values.

The simulated cervical tissue includes one or more simulated lesions on the surface of the simulated cervical tissue. In one aspect, the simulated lesion is a fluorescent pigment. In another aspect, the simulated lesion includes a fluorescent silicone pigment. In one aspect, a simulated lesion will be from about 0.2 to about 0.7 cm in diameter, or about 0.2, 0.3, 0.4, 0.5, 0.6, or about 0.7 cm in diameter, or a combination of any of the foregoing values, or a range encompassing any of the foregoing values. In another aspect, the lesions will have a stromal depth of from about 0.1 to about 0.3 cm, or of about 0.1, 0.15, 0.2, 0.25, or about 0.3 cm, or a combination of any of the foregoing values, or a range encompassing any of the foregoing values. In one aspect, the fluorescent pigment is IGNITE™ pigments (Smooth-On, Macungie, PA). In another aspect, the fluorescent pigment is IGNITE™ white pigment.

Methods for Preparing the Simulated Cervical Tissue

Disclosed herein are methods for constructing the simulated cervical tissue. In one aspect, the method for making the simulated cervical tissue involves the following steps:
  a. melting the gel to produce a first composition;
  b. admixing the red-toned pigment to the first composition to produce a second composition;
  c. pouring the second composition into a mold;
  d. curing the second composition in the mold; and
  e. applying one or more simulated lesions on a first face of the simulated cervical tissue.

In one aspect, the gel is completely melted prior to admixing the red-toned pigment in order to ensure the pigment is evenly or homogeneously dispersed throughout the gel. The melting step and subsequent mixing step can be performed in a separate apparatus or the same apparatus. After the red-toned pigment and gel, have been admixed, the mixture (i.e., the second composition) is poured into a mold. The dimensions of the mold (e.g., thickness, diameter) are similar to those of the human cervix. In one aspect, the mold has a thickness of from about 1 cm to about 4 cm, or of about 1, 1.5, 2, 2.5, 3, 3.5, or about 4 cm, or a combination of any of the foregoing values, or a range encompassing any of the foregoing values.

After being poured into the mold, the second composition is allowed to cure for a sufficient time so that the gel solidifies to the point it can be removed from the mold. In one aspect, curing can be performed at room temperature. The curing time can vary depending upon the selection and amount of gel that is used to produce the simulated cervical tissue.

In one aspect, prior to completely curing, a small indent can be formed on one face (i.e., first face) of the simulated cervical tissue, where the indent simulates the cervical os. In one aspect, following curing, the simulated cervical tissue has a thickness of from about 1 cm to about 4 cm, or of about 1, 1.5, 2, 2.5, 3, 3.5, or about 4 cm, or a combination of any of the foregoing values, or a range encompassing any of the foregoing values.

In one aspect, one or more simulated lesions can be applied to the first face of the simulated cervical tissue. The number and position of the lesions on the first face can vary. The simulated lesions can be applied to the surface of the simulated cervical tissue using techniques known in the art including manual techniques (e.g., with a paintbrush) or automated techniques.

FIG. 1 provides an exemplary simulated cervical tissue described herein. The simulated cervical tissue 10 has a first surface 11. Simulated lesions 12 are positioned on the first surface 11. The cervical os 13 is positioned roughly centered in the first face 11 of the simulated cervical tissue.

Applications

The simulated cervical tissue described herein provides a useful training tool for performing colposcopies. The simulated cervical tissue can be incorporated into existing cervical trainers such as, for example, the ZOE® S504.200 gynecological skills trainer manufactured by Gaumard®. Depending upon the skill trainer, the simulated cervical tissue described herein can be modified so that it can be secured to the trainer.

Once the simulated cervical tissue described herein has been integrated with the trainer, it is ready to be used as a colposcopy trainer for conducting cervical examination and biopsies. Similar to a real-time colposcopy, a colposcope provides a magnified view of the simulated cervical tissue with one or more lesions. The simulated lesions will appear as bright spots upon illumination by the colposcope. As part of the training tool, the simulated lesions can be removed from the simulated cervical tissue using cervical biopsy forceps. Thus, the simulated cervical tissue provides the practitioner a useful training tool to perform cervical examination and biopsies. Furthermore, once all of the simulated lesions have been removed from the simulated cervical tissue, the simulated cervical tissue can be removed from the cervical trainer and subsequently recycled.

Figure 2:
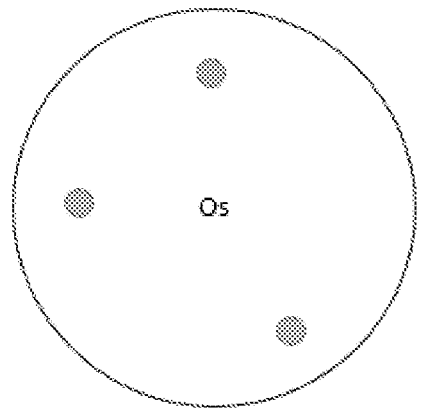
FIG. 2 shows a diagram of kit having six different simulated cervical tissues with simulated lesions at different positions in each simulated cervical tissue.
Figure 2:
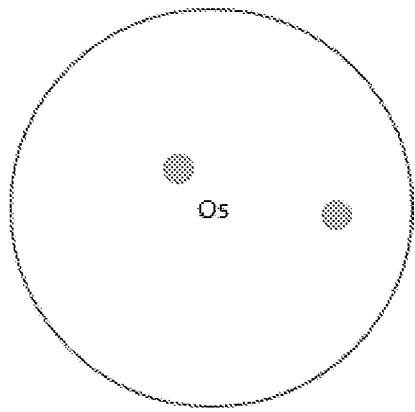
Figure 2:
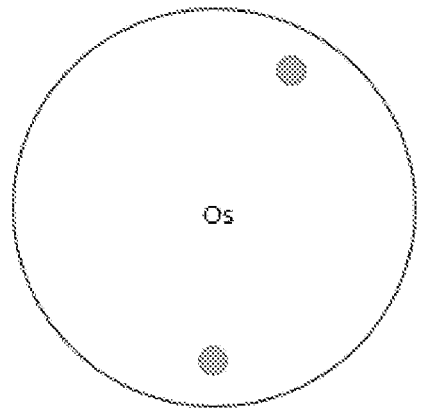
Figure 2:
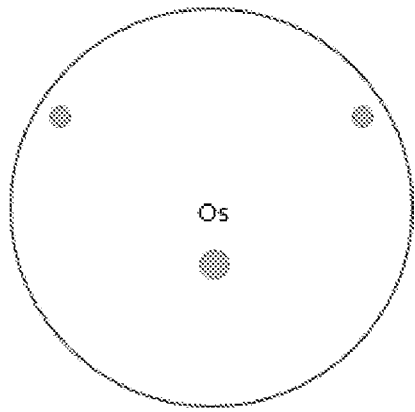
Figure 2:
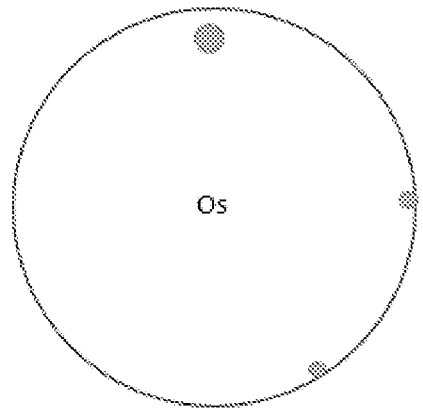
Figure 2:
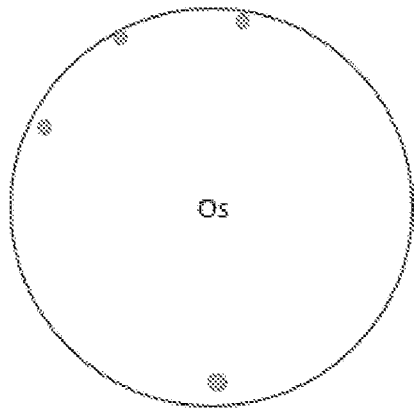

The number and position of the simulated lesions on the simulated cervical tissue can also vary. As part of the training tool, the position of the simulated lesions can vary in degree of difficulty with respect to observation and removal. In one aspect, described herein is a kit comprising two or more simulated cervical tissues described herein, wherein the simulated cervical tissues are different from each based on (1) the number of simulated lesions on each first face of each simulated cervical tissue, (2) the position of the simulated lesions on each first face of each simulated cervical tissue, or a combination thereof. The number of the simulated cervical tissues in the kit can vary. In one aspect, the kit includes from 2 to 10 simulated cervical tissues described herein. FIG. 2 provides a series of exemplary simulated cervical tissues with simulated lesions located on different positions of the simulated tissue that can be part of the kit. As shown in FIG. 2, the difficulty level for identifying and removing the simulated lesions can vary based on the size and position of the simulated lesions.

Aspects

Aspect 1. A simulated cervical tissue comprising a gel and red-toned pigment, wherein the cervical tissue has a first face, wherein the first face comprises one or more simulated lesions.

Aspect 2. The simulated cervical tissue of Aspect 1, wherein the one or more simulated lesions independently have a diameter of from about 0.2 cm to about 0.7 cm.

Aspect 3. The simulated cervical tissue of Aspects 1 or 2, wherein the one or more simulated lesions independently have a stromal depth of from about 0.1 cm to about 0.3 cm.

Aspect 4. The simulated cervical tissue of any one of Aspect 1-3, wherein the red-toned pigment comprises a silicone pigment.

Aspect 5. The simulated cervical tissue of any one of Aspects 1-4, wherein the gel comprises a medical gel.

Aspect 6. The simulated cervical tissue of any one of Aspects 1-5, wherein the gel comprises gelatin.

Aspect 7. The simulated cervical tissue of any one of Aspects 1-6, wherein the gel comprises 100% gelatin.

Aspect 8. The simulated cervical tissue of any one of Aspects 1-7, wherein the gel is 100% gelatin having a density of from about 800 kg/m$^3$ to about 850 kg/m$^3$.

Aspect 9. The simulated cervical tissue of any one of Aspects 1-8, wherein the gel is 100% gelatin having a density of from about 800 kg/m$^3$ to about 850 kg/m$^3$ and a Young's modulus of from about 300 kPa to about 350 kPa.

Aspect 10. The simulated cervical tissue of any one of Aspects 1-9, wherein the weight ratio of the gel to the red-toned pigment is from 0.001% total gel weight to 3% total gel weight.

Aspect 11. The simulated cervical tissue of any one of Aspects 1-10, wherein the simulated lesion comprises a fluorescent pigment.

Aspect 12. The simulated cervical tissue of any one of Aspects 1-11, wherein the simulated lesion comprises a fluorescent silicone pigment.

Aspect 13. The simulated cervical tissue of any one of Aspects 1-12, wherein the first face has a depression positioned approximately in the center of the first face.

Aspect 14. The simulated cervical tissue of any one of Aspects 1-13, wherein the simulated cervical tissue has a thickness of from about 1 cm to about 4 cm.

Aspect 15. A kit comprising two or more simulated cervical tissues of any one of Aspects 1-14, wherein the simulated cervical tissues are different from each based on (1) the number of simulated lesions on each first face of each simulated cervical tissue, (2) the position of the simulated lesions on each first face of each simulated cervical tissue, or a combination thereof.

Aspect 16. The kit of Aspect 15, wherein the kit comprises from 2 to 10 simulated cervical tissues.

Aspect 17. A cervical model comprising the simulated cervical tissue of any one of Aspects 1-14.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1: Construction of the Simulated Cervical Tissue

Materials

SILC PIG™ pigments (Smooth-On, Macungie, PA) in red, blood, red, and white colors, IGNITE™ (Smooth-On, Macungie, PA), and Humimic medical grade gel (no. 4) were purchased from the respective manufacturers and used as received. A crockpot, a one ounce plastic shot glass, a small paint brush, and stir sticks were also used in the construction of the simulated tissue.

Construction of Simulated Cervical Tissue

Step 1: The crockpot was turned on high. Humimic medical grade ballistics gel was cut into small pieces and placed in the hot crockpot. The gel was completely melted with no bubbles left.

Step 2: While the crockpot is heating up, the plastic shot glass was cut so that it stands 1-1½ inch tall.

Step 2: Silc Pig pigments red, blood red, and white were mixed together to reach the desired pink color of the cervix. The pigments were directly added to melted gel in the crockpot.

Step 3: The colored gel was poured into the shot glass completely to the rim. The gel was allowed to cure slightly for roughly a minute. A small indent in the center of the gel face was made using the end of a stir stick or small paint brush to create the cervical os. Using the paint brush, white fluorescent pigment on the face of the simulated cervical tissue.

Step 4: The simulated cervical tissues was allowed to cure completely (approximately 24 hours) before using. The simulated cervical tissue can then be inserted to cervical trainer and is ready for use.

Example 2: Lesion Size and Positioning in an Exemplary Kit

FIG. 2 provides an exemplary kit with six simulated cervical tissues described herein. In one aspect, a typical kit will have six simulated tissues with two each at "easy," "medium," and "hard" levels. Top left: this simulated cervical tissue is considered an "easy" difficulty level. Lesions at 12, 9, and 5 o'clock positions are moderately sized and easily positioned for removal within the transformation zone. In this model, a learner may not have fully opened the speculum and could still view these lesions with the ability to biopsy them. Top right: this simulated cervical tissue is considered an "easy" difficulty level. One lesion is positioned closer to the cervical os, still with a 9 o'clock placement but more medial, and should be clearly visible within the transformation zone in the speculum. The lesion size is moderate, as it is with the 3 o'clock lesion. Both lesions in this model can be biopsied without instrument manipulation on the part of the learner; approaching from any angle would lead to an adequate biopsy. Middle left: This simulated cervical tissue is considered "medium" difficulty level. In this model, the sizes of the lesions change from a medium to a mix of medium and smaller lesions. The lesions begin to vary from easily seen even with poor speculum positioning to a requirement to have an exact positioning required in order to view all lesions. In this model, the lesion between 12 and 1 o'clock is smaller and close to the edge of the cervix. If the learner does not have a clear view of the entire cervix, they will miss this smaller lesion. The learner will also need to turn the instrument in order to take an appropriate biopsy of the lesion. The lesion at 6 o'clock is medium sized and would be easily visible, so the learner may conclude they have seen everything if the speculum is inappropriately placed. Middle right: this is considered a "medium" difficulty level model. Two smaller lesions appear at 10 and 2 o'clock requiring precise speculum positioning and the ability to look at the periphery of the cervix, with an obvious lesion at 6 o'clock. Bottom left: this is considered a "hard" difficulty level. All of the lesions are smaller or in more difficult regions to see, requiring the learner to have perfect speculum placement and peripheral tissue identification. The lesion at 12 o'clock is somewhat larger than the lesions at 3 and 6 o'clock, but all of these will require the learner to pull together scanning of the entire region and instrument placement. Bottom right: this is considered a "hard" difficulty level with marginal placement of lesions and very small opportunities for biopsy.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A simulated cervical tissue comprising a gel and red-toned pigment, wherein the cervical tissue has a first face, wherein the first face comprises one or more simulated lesions, and the first face has a depression positioned approximately in the center of the first face.

2. The simulated cervical tissue of claim 1, wherein the one or more simulated lesions independently have a diameter of from about 0.2 cm to about 0.7 cm.

3. The simulated cervical tissue of claim 1, wherein the one or more simulated lesions independently have a stromal depth of from about 0.1 cm to about 0.3 cm.

4. The simulated cervical tissue of claim 1, wherein the red-toned pigment comprises a silicone pigment.

5. The simulated cervical tissue of claim 1, wherein the gel comprises a medical gel.

6. The simulated cervical tissue of claim 1, wherein the gel comprises gelatin.

7. The simulated cervical tissue of claim 1, wherein the gel comprises 100% gelatin.

8. The simulated cervical tissue of claim 1, wherein the gel is 100% gelatin having a density of from about 800 $kg/m^3$ to about 850 $kg/m^3$.

9. The simulated cervical tissue of claim 1, wherein the gel is 100% gelatin having a density of from about 800 $kg/m^3$ to about 850 $kg/m^3$ and a Young's modulus of from about 300 kPa to about 350 kPa.

10. The simulated cervical tissue of claim 1, wherein the weight ratio of the gel to the red-toned pigment is from 0.001% total gel weight to 3% total gel weight.

11. The simulated cervical tissue of claim 1, wherein the simulated lesion comprises a fluorescent pigment.

12. The simulated cervical tissue of claim 1, wherein the simulated lesion comprises a fluorescent silicone pigment.

13. The simulated cervical tissue of claim 1, wherein the simulated cervical tissue has a thickness of from about 1 cm to about 4 cm.

14. A cervical model comprising the simulated cervical tissue of claim 1.

15. A kit comprising two or more simulated cervical tissues, wherein the simulated cervical tissues are different from each based on (1) the number of simulated lesions on each first face of each simulated cervical tissue, (2) the position of the simulated lesions on each first face of each simulated cervical tissue, or a combination thereof, and wherein each simulated cervical tissue comprises a gel and red-toned pigment, wherein the cervical tissue has a first face, wherein the first face comprises one or more simulated lesions.

16. The kit of claim 15, wherein the kit comprises from 2 to 10 simulated cervical tissues.

* * * * *